(12) United States Patent
Dahl

(10) Patent No.: US 9,983,679 B2
(45) Date of Patent: May 29, 2018

(54) INTERACTION WITH PORTABLE DEVICES

(75) Inventor: Tobias Dahl, Oslo (NO)

(73) Assignee: ELLIPTIC LABORATORIES AS, Oslo (NO)

(*) Notice: Subject to any disclaimer, the term of this patent is extended or adjusted under 35 U.S.C. 154(b) by 333 days.

(21) Appl. No.: 13/817,766

(22) PCT Filed: Aug. 18, 2011

(86) PCT No.: PCT/GB2011/051560
§ 371 (c)(1),
(2), (4) Date: Mar. 15, 2013

(87) PCT Pub. No.: WO2012/022979
PCT Pub. Date: Feb. 23, 2012

(65) Prior Publication Data
US 2013/0162527 A1    Jun. 27, 2013

(30) Foreign Application Priority Data

Aug. 19, 2010 (GB) .................... 1013887.3
Jan. 6, 2011 (GB) .................... 1100154.2

(51) Int. Cl.
*G06F 3/01* (2006.01)
*G06F 1/16* (2006.01)
*G06F 3/0346* (2013.01)

(52) U.S. Cl.
CPC ............ *G06F 3/017* (2013.01); *G06F 1/1632* (2013.01); *G06F 3/0346* (2013.01)

(58) Field of Classification Search
CPC ...... G06F 3/017; G06F 1/3215; G06F 1/3218; G06F 1/3206; G06F 1/325; G06F 2201/86; G06F 2201/825; G06F 2200/1639; G06F 2200/1638; G06F 2200/1637; G06F 2200/1631
See application file for complete search history.

(56) References Cited

U.S. PATENT DOCUMENTS

| | | | |
|---|---|---|---|
| 2004/0209489 A1* | 10/2004 | Clapper | H01R 13/6205 439/39 |
| 2007/0211031 A1* | 9/2007 | Marc | G06F 3/0304 345/163 |
| 2008/0002350 A1* | 1/2008 | Farrugia | 361/686 |
| 2008/0100572 A1* | 5/2008 | Boillot | 345/158 |

(Continued)

OTHER PUBLICATIONS

Search Report dated Nov. 7, 2011 from International Application No. PCT/GB2011/051560.
(Continued)

*Primary Examiner* — William Boddie
*Assistant Examiner* — Jeffrey A Parker
(74) *Attorney, Agent, or Firm* — Beyer Law Group LLP

(57) ABSTRACT

A portable electronic device comprises means for generating or receiving a signal indicating that it has been placed in a predetermined position. The portable electronic device is configured upon receiving said signal to enable user interaction with the portable electronic device by a touchless interaction mode. Also disclosed are various arrangements of a peripheral device and a portable electronic device which cooperate to provide a touchless interaction mode—e.g. through transducers and/or processing means being provided in the peripheral device.

27 Claims, 6 Drawing Sheets

(56) References Cited

U.S. PATENT DOCUMENTS

2011/0148798 A1\* 6/2011 Dahl ...................... G06F 3/011
 345/173
2011/0291927 A1\* 12/2011 Slaby .................. B60R 11/0241
 345/158

OTHER PUBLICATIONS

Written Opinion dated Nov. 7, 2011 from International Application No. PCT/GB2011/051560.

\* cited by examiner

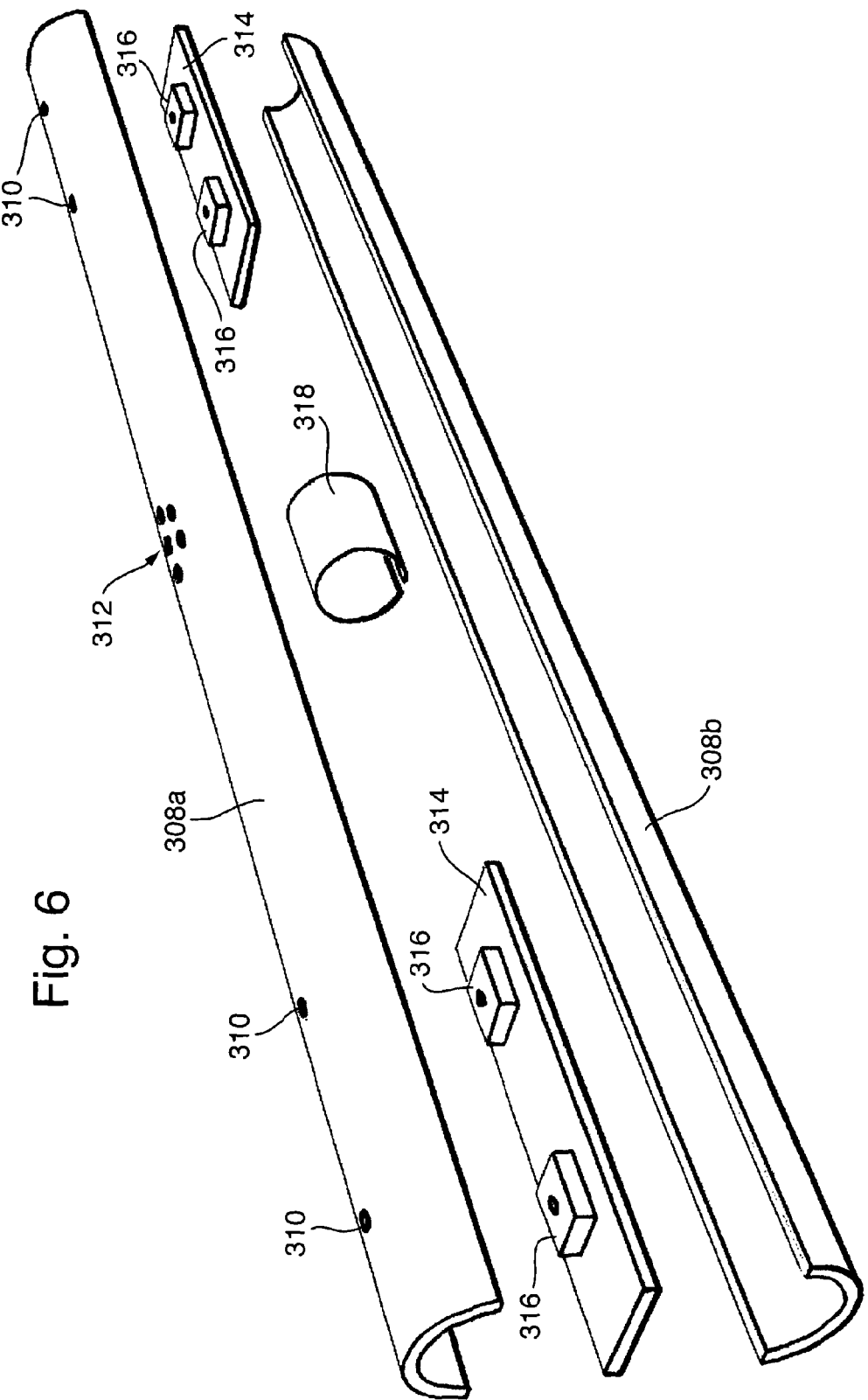

INTERACTION WITH PORTABLE DEVICES

This application relates to the interaction between a user and a portable electronic device.

The number and sophistication of portable electronic devices, particularly smart phones, tablet computers and other portable computers, is growing extremely rapidly. Furthermore, there is some movement towards extending the capabilities of such devices by connecting them to "docking stations". The most common examples of these include an audio amplifier and loudspeakers in order to enhance the audio reproduction capability of the portable device. There are other examples, e.g. a docking station incorporating a physical keyboard to allow interaction with a tablet computer that may only have a touch-screen keyboard built in.

The applicant has, however, devised certain beneficial arrangements which can enhance the utility and convenience of certain portable electronic devices.

When viewed from a first aspect the present invention provides a portable electronic device comprising means for generating or receiving a signal indicating that the portable electronic device has been placed in a predetermined position and wherein the portable electronic device is configured upon receiving said signal to enable user interaction with the portable electronic device by a touchless interaction mode.

Thus it will be seen by those skilled in the art that in accordance with the invention the portable electronic device uses a signal indicating that it is in a predetermined position to enable the user to interact with it touchlessly. A touchless interaction mode is defined as one in which an input object, which may be e.g. part of the user's body such as a finger or hand or may be an inanimate object such as a stylus, can be used to control one or more functions of the electronic device without physical contact between the device and the input object being necessary. It should be understood, however, that in general a touchless interaction mode does not exclude physical contact between the input object and the device. Such contact could result in the same input as if the device had not been contacted or could give rise to a different input (i.e. a mixed touch/touchless interaction mode).

The touchless interaction mode could be based on any one of a number of different technologies, or indeed a combination of them. Suitable technologies include infrared sensing, optical image recognition and capacitive sensing. Presently, however, it is preferred that the touchless interaction mode comprises the transmission, reflection and detection of acoustic, particularly ultrasonic signals.

The predetermined position could simply comprise an orientation of the device, but in a set of preferred embodiments the predetermined position of the electronic device is one in which it is on, near or against a peripheral device such as a stand, holster, docking station, sleeve or case. Thus the peripheral device may be designed to be static or portable.

The invention extends to a system comprising a portable electronic device comprising means for generating or receiving a signal indicating that the portable electronic device has been placed in a predetermined position on, near or against a peripheral device and wherein the portable electronic device is configured upon receiving said signal to enable user interaction with the portable electronic device by a touchless interaction mode.

The system described above can be used e.g. in homes, offices, on the move etc. although one exemplary advantageous implementation is a device which may be placed in a holster in a car and which then allows a user to interact with the device touchlessly, which is safer than requiring the user to touch the device—e.g. to press a button, and which is more intuitive and straightforward than voice control.

In one set of embodiments the portable electronic device itself makes the determination as to when it is in the predetermined position. In the case of the position being a particular orientation, this might be achieved with gyroscopes, magnetometers, tilt switches or the like. When the predetermined position is on or against a peripheral device, the portable electronic device could, for example, comprise a pressure sensor on an edge which can detect when the device is placed against the peripheral device. Alternatively the portable electronic device could comprise some other proximity sensing arrangement e.g. based on light, magnetic field, electric field etc. The peripheral device (stand, holster, sleeve, case etc.) could comprise a component which co-operates with the electronic device to enable such a detection (e.g. a magnet, infrared transmitter etc. on the stand or holster) or the functionality may be incorporated entirely in the electronic device e.g. in the case of a pressure sensor or transmitter/receiver pairing on the device which detects a reflection from the object against or on which the device is placed.

In another set of embodiments, the portable electronic device does not itself determine that it has been placed in the predetermined position but rather receives a signal indicative thereof from an external source, most typically the peripheral device itself. In a simple example, the portable electronic device might be placed on a stand or in a sleeve which is able to detect this and communicate back to the device that it has been placed on the stand. This set of embodiments implies a data communication between the portable electronic device and the co-operating peripheral device. Indeed, this is a subset of a more general set of embodiments in which the portable electronic device and the peripheral device are capable of data communication, which may be either one-way or two-way. Such data communication could be by means of a physical connection or could be wireless e.g. infrared, ultrasound or any suitable wireless radio protocol such as Bluetooth, WiFi, Zigbee etc. or any combination of these.

In one set of embodiments, the peripheral device comprises one or more transducers for implementing the touchless interaction mode. For example, in the set of embodiments where the touchless interaction mode is implemented using ultrasonic signals, the peripheral device may comprise ultrasonic transmitters and/or receivers. The transducers on the peripheral device might be sufficient on their own to implement the touchless interaction mode or they might supplement other transducers provided on the portable electronic device itself. The provision of transducers on the peripheral device demonstrates one of the advantages of some embodiments of the invention in that when the electronic device is placed on or against the peripheral device in the predetermined position, the location of the transducers on the peripheral device relative to the portable electronic device will be known which simplifies their use in determining a position of the input object. This implies of course that the portable electronic device can only be placed on or in the peripheral device in one location/orientation which is true of some embodiments but not essential.

Where, as in some preferred embodiments, the peripheral device comprises transducers to implement the touchless interaction mode, it is not necessary for the portable electronic device to receive a separate explicit signal indicating that it has been placed on or in the peripheral device—the signal could comprise the data supplied by the transducers or control signals supplied by processing means in the peripheral device.

In one set of embodiments, the peripheral device comprises means for providing electrical power to the portable electronic device. This electrical power could be used to operate the portable electronic device, to recharge its internal battery, or both. The power could be provided by wireless means—e.g. an inductive or capacitive coupling, but preferably comprises a physical connection. In the set of embodiments in which there is a data connection between the portable electronic device and the peripheral device, this may be integrated with the aforementioned means for providing electrical power to the portable electronic device.

In a set of embodiments, the portable electronic device and the peripheral device are configured to pass signals between them to enable the touchless interaction mode. When viewed from another aspect the invention provides a peripheral device for use with a portable electronic device, the peripheral device comprising one or more transducers and being configured to pass signals to/from said portable electronic device to enable a user to interact with the portable electronic device using a touchless interaction mode. In a specific example the invention comprises a peripheral device for use with a portable electronic device, the peripheral device comprising one or more ultrasonic transducers, the peripheral device being adapted to transmit and/or receive ultrasonic signals and to communicate with the portable electronic device. The peripheral device could therefore add touchless functionality to an existing portable electronic device. As before the peripheral device could be designed to be static such as a docking station or stand, or to be portable such as a sleeve or case.

There are many different ways in which the portable electronic device and peripheral device might pass signals between them to enable the touchless interaction mode. For example, in one set of embodiments where the peripheral device is provided with one or more transducers for implementing the touchless interaction mode, there could be a simple analogue audio connection between the transducers and the portable electronic device—e.g. by means of a microphone input jack socket and/or a headphone output jack socket. This would enable the peripheral device to be kept relatively simple and inexpensive whilst still giving the advantages of providing one or more additional transducers e.g. to increase the accuracy or reliability of detection of the movement and/or location of the input object. For example, having transducers on a stand may allow them to be more widely separated than is possible on the portable electronic device itself which can improve their detection capabilities. In these embodiments, the signals from the transducers can be processed and analysed by the computing power provided in the electronic device.

In another set of embodiments, some processing is carried out by the peripheral device. This could be processing purely in the analogue domain (e.g. filtering), but in a set of embodiments it comprises conversion to or from a digital signal, e.g. by means of an analogue-to-digital converter and/or a digital-to-analogue converter. Of course, any degree of processing in the digital domain could be carried out by the peripheral device e.g. calculation of impulse responses, Fourier transforms, right up to movement characterisation such as gesture recognition, sweep determination, finger tracking etc. to provide control inputs for the portable electronic device. This might be advantageous in allowing the peripheral device to be used with a variety of electronic devices which do not require any special software or hardware adaptation, in which case the data communication between them would comprise standard control signals to control the operation of the electronic device (e.g. the peripheral device could act as a virtual mouse, trackball, keyboard, etc.). Thus a set of preferred embodiments comprises a peripheral device comprising means for characterising the movement of an input object and means for providing control signals to a/the portable electronic device based on said movement characterisation.

The advantage of sharing processing of the signals between the peripheral device and the portable electronic device is that it reduces the requirements placed on the portable electronic device in order to implement the touchless interaction mode. This could be particularly advantageous where specialist components or processing power are necessary in order to implement the touchless interaction mode which might not be required when the portable electronic device is used without such a mode.

When viewed from another aspect the invention provides a portable electronic device and a peripheral device in data communication with one another such that they cooperate to enable a touchless interaction mode for controlling one or more functions of the portable electronic device.

This aspect of the invention extends to a peripheral device adapted for data communication with a portable electronic device such that in use they cooperate to enable a touchless interaction mode for controlling one or more functions of the portable electronic device.

As previously discussed, there are several advantages to sharing the operation of a touchless interaction mode between two devices. As before, the interaction between the two could simply comprise the peripheral device passing analogue signals from the transducer(s) to the portable electronic device, but preferably the two devices share between them the digital processing required to convert signals from transducers provided on either or both devices into control signals to control the portable electronic device.

In a set of preferred embodiments, the touchless interaction mode comprises the use of ultrasonic signals reflected from an input object to control a function of the portable electronic device. The ultrasonic transducers could be provided exclusively on the portable electronic device, exclusively on the peripheral device or could be divided between them. The peripheral device could comprise a stand for the portable electronic device, i.e. it could be configured such that the electronic device is placed on or against the peripheral device. The peripheral device could be used to provide electrical power to the portable electronic device either to operate it, to recharge its internal battery, or both.

In one set of embodiments of either aspect of the invention the peripheral device comprises a stand including one or more tubular support elements. These may be any cross-sectional shape but are conveniently circular section tubes. Such a stand may, in accordance with some of the foregoing aspects of the invention, not include an ultrasonic transducer, but preferably it comprises at least one ultrasonic transducer. Most preferably the transducer(s) is/are housed within the tubes with suitable apertures permitting the passage of ultrasonic signals. In one set of preferred embodiments a polyvinylidene flouride (PVDF) flexible ultrasonic transducer is employed. These are available in cylindrical form, e.g. from Measurement Specialties in Hampton, Va., USA, which are particularly convenient in embodiments having cylindrical support members as they can be easily and discreetly housed therein.

In accordance with any of the foregoing aspects of the invention, in one set of embodiments the peripheral device comprises a transmitter and a signal generator configured to drive the transmitter to transmit a suitable signal to permit the touchless interaction mode. The benefit of providing a signal generator on the peripheral device is that a much lower bandwidth between the portable electronic device and the peripheral device is required. For example, the electronic device could simply send a trigger signal to the signal generator in the peripheral device in order to trigger a transmission of a suitable wave-form, without the portable electronic device having to communicate the entire wave-form to the transmitter in the peripheral device. As will be appreciated, this could represent a significant saving in bandwidth across the connection between the portable electronic device and the peripheral device.

In one set of embodiments, the portable electronic device is provided with means for transmitting a signal for receipt by the peripheral device for indicating the proximity and/or location of the portable electronic device with respect to the peripheral device. This could be used, for example, to "wake up" the peripheral device when it is in a reduced power consumption ("sleep") mode or in a more sophisticated example, it might be used to determine exactly where the portable electronic device has been placed on the peripheral device (which could then be taken into account when calculating the position of an input object during the touchless interaction mode) and/or the aforementioned signal could be used to identify what device or what type of device is being placed on the peripheral device. This opens up the possibility of a multipurpose peripheral device for use with different portable electronic devices.

In a set of simpler embodiments the peripheral device comprises means for detecting the presence of the electronic device in order to wake up the peripheral device. This is particularly applicable where the peripheral device comprises a transmitter for facilitating the touchless interaction since it can ensure that the transmitter only transmits when required, thereby conserving power. The means for detecting presence could comprise any of a number of different sensors such as a micro-switch, infra-red detector, magnetic sensor etc.

In a set of preferred embodiments, the portable electronic device and/or the peripheral device is/are configured to give an indication that a touchless interaction mode is active. This could, for example, comprise a visual indication (e.g. a light being illuminated or changing colour), a graphical indication (e.g. the appearance of a symbol or picture), an audible indication (e.g. a beep or the like) or indeed any combination of these.

Certain preferred embodiments of the invention will now be described, by way of example only, with reference to the accompanying drawings in which:

FIG. 6 is an exploded view of one of the tubular support members of the stand shown in FIG. 5.

Figure 1:
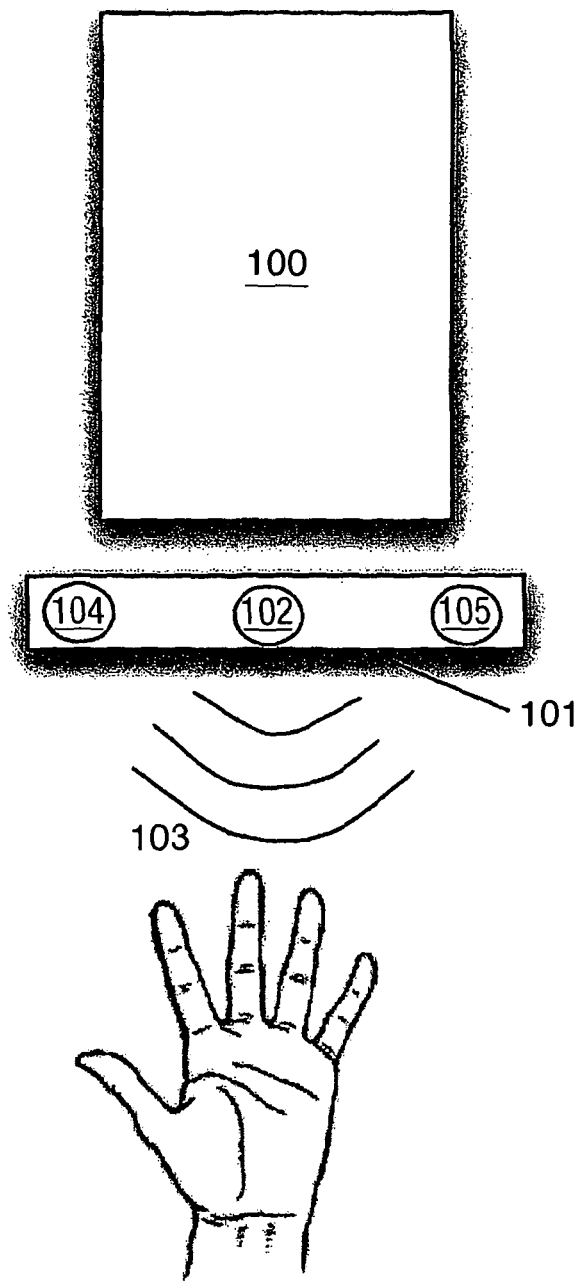
FIG. 1 is a schematic illustration illustrating of a first embodiment of the present invention.

Turning first to FIG. 1 there may be seen a portable electronic device 100 in the form of a tablet computer and a peripheral device 101 in the form of a corresponding docking station. The docking station 101 is provided with an ultrasonic transmitter 102 and two ultrasonic receivers 104, 105. It is also provided with a Bluetooth short-range radio communication module to allow the docking station 101 to communicate with the tablet computer 100. The docking station could be powered by a mains adaptor and/or could comprise its own power source such as one or more batteries.

In use the tablet computer 100 determines that it has been placed on or near the docking station 101. This determination could be carried out in a number of different ways: e.g. by making a physical connection between them, monitoring the signal strength of the Bluetooth connection, using a pressure sensor, detecting a reflection of a signal from the tablet 100 by the docking station 101 etc. It will be appreciated that in several cases physical contact between the tablet computer 100 and the docking station 101 is not necessary.

Once the tablet computer 100 has determined that it is on or near the docking station 101, a touchless interaction mode can be enabled. This may happen automatically or may require input from a user to turn the feature on either before or after the docking determination has been made. Enabling the touchless interaction mode causes tablet computer 100 to transmit an output signal wave-form to the docking station 101 over the Bluetooth link. The docking station passes this to the transmitter 102 which transmits a corresponding ultrasound signal into the air. The sound waves reflect off the hand 103, and are received by the receivers 104 and 105. These signals are then passed back, wirelessly via the Bluetooth link, to the tablet computer 100 where further processing takes place. For instance, impulse response estimates can be computed by comparing the output and the input signals, as disclosed in WO 2009/115799 or WO 2006/067436. Furthermore, gestures can be recognized either from the impulse responses or from the received signals themselves. Movements of the user's hand 103 are deduced from the processed signals, which movements are then interpreted as inputs to control functions on the tablet computer, such as selecting items, moving digital objects (e.g. icons), or altering the properties of content (zooming, changing volume etc) to give just some examples.

It will be appreciated that the embodiment described above has the advantage of providing a comparatively inexpensive docking station since it only needs a few transducers, D-A and A-D converters and a Bluetooth module; there is no need for any complex signal processing to be carried out on the docking station and hence no need for the more expensive processors, memory etc. this would entail; instead the signal processing can be carried out on the tablet computer. Moreover since this embodiment utilises the tablet computer's Bluetooth connectivity, there is no need to make a physical connection to the device which may be advantageous in some circumstances. Of course in an alternative embodiment a physical connection could be used in place of the Bluetooth connection.

In another variant of the embodiment shown in FIG. 1 it may be desirable to carry out some of the required signal processing on the docking station 101 and some on the tablet computer 100, particularly if the tablet computer has a relatively inexpensive CPU with a low number of clock cycles per second, it can be advantageous to do part of the processing in the docking station 101. For instance, if impulse responses need to be computed, the pulse decoding or pulse decompression could be carried out on a low-cost field-programmable gate array (FPGA) or application-specific integrated circuit (ASIC) embedded into the docking station 101. In this situation, the signals passed from the docking station 101 to the tablet 100 would be impulse response signals rather than raw data signals. It would be possible to use a low-cost FPGA such as the Actel Igloo Family. Pulse decompression could be done in frequency domain, such as via fast Fourier transform (FFT). It could also be implemented using a sequence of shorter FFT operations, assembled to become one larger FFT operation, or the filtering could be implemented using shorter segments combined with overlap-add or overlap-save filtering techniques. Alternatively, a 1-bit correlator, or a sequence of 1-bit correlators could be used to emulate a full correlation step, using time-domain processing. Conducting part of the processing on the FPGA leaves more resources free for on-screen graphics and other functionality on the core CPU of the tablet computer 100.

Figure 2:
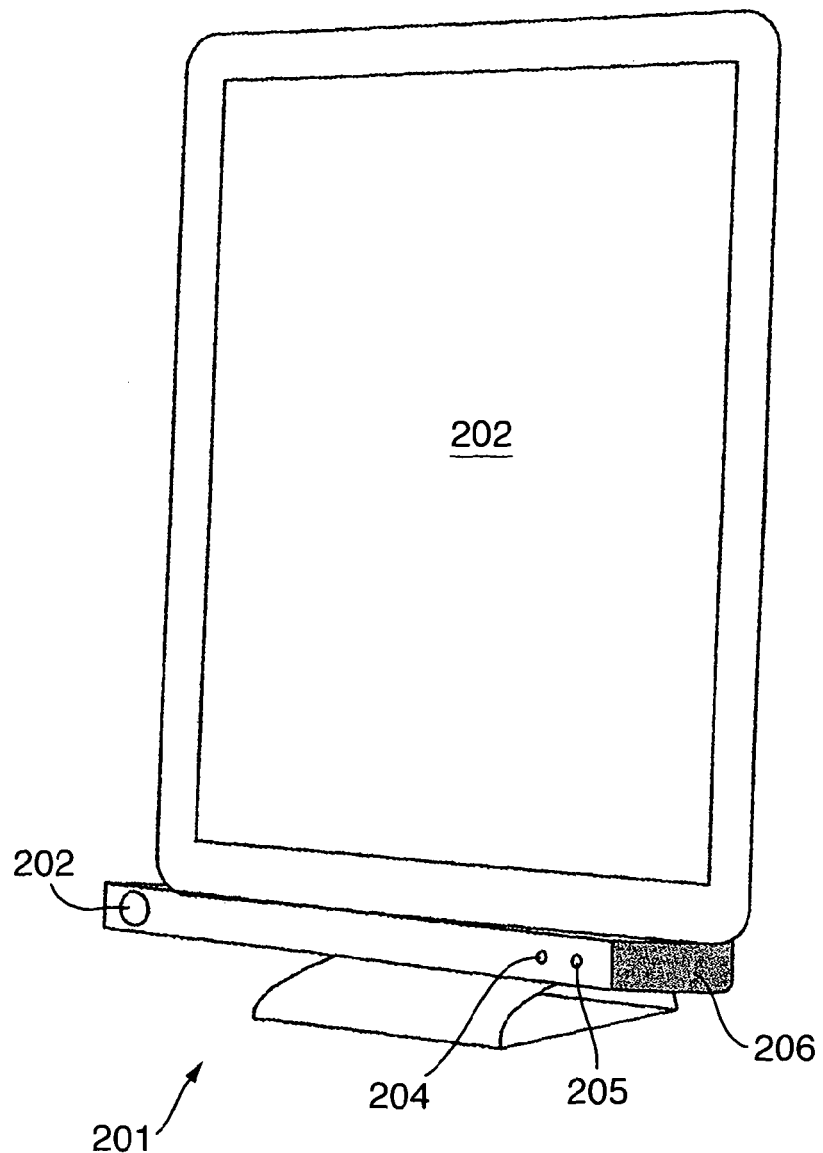
FIG. 2 is an exemplary embodiment of the invention in the form of a docking station for a tablet computer.
Figure 3:
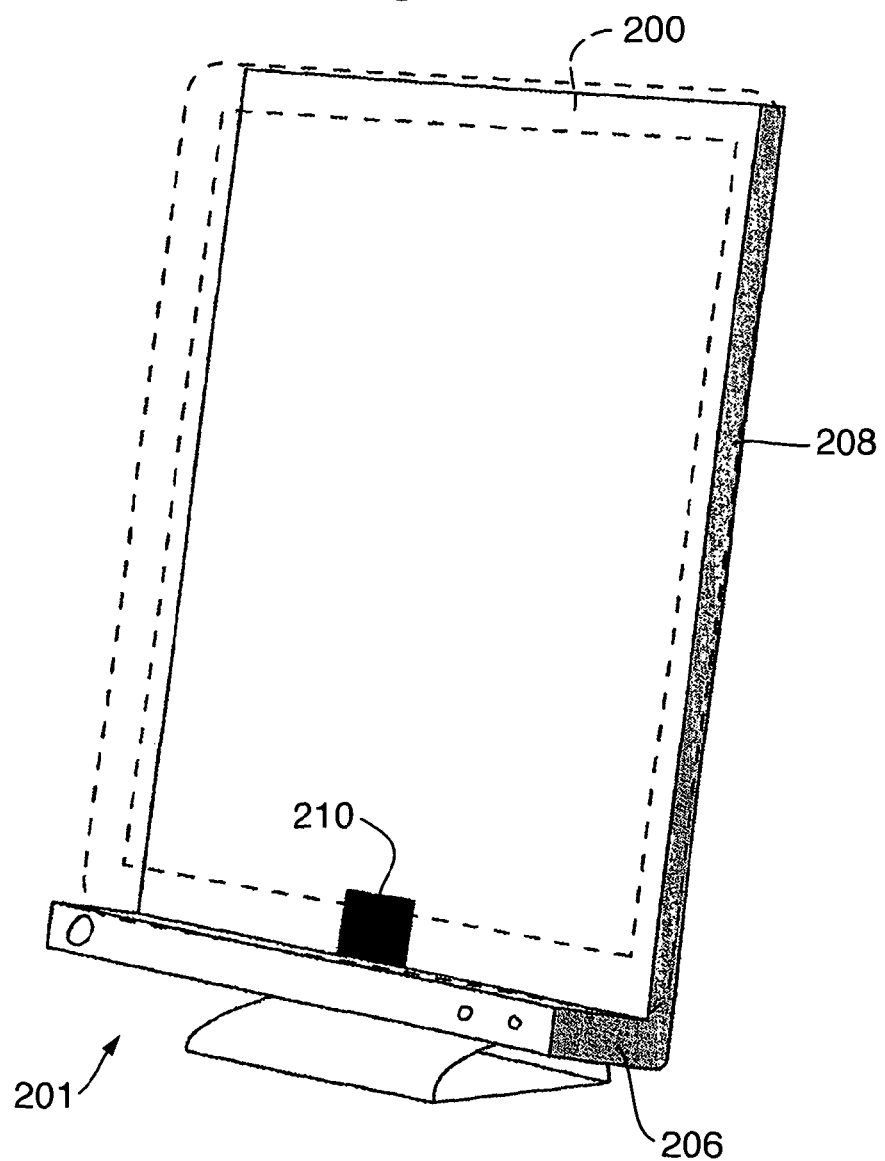
FIG. 3 is a view of the docking station of FIG. 2 with the tablet computer shown in outline.

A further embodiment of the invention is shown in FIGS. 2 and 3. In this embodiment the docking station 201 has a physical form similar to a bookstand, comprising a ledge portion 206 and a back-rest portion 208. The ledge portion 206 accommodates the ultrasonic transmitter 202 and the ultrasonic receivers 204, 205. The tablet computer 200 rests with its lower edge on the ledge portion 206 and is slightly reclined so as to be supported by the back-rest portion 208. As can be seen from FIG. 3 where the tablet computer is shown in phantom outline, at the bottom-centre of the back-rest portion 208 there is provided a tablet presence detector 210. This could detect the presence of the tablet computer 200 by any suitable means of weight, light, infra-red beams etc.

In use when the tablet computer is simply placed onto the docking station 201 the presence sensor 210 triggers the transmission of a signal to the tablet computer 200. This could be done wirelessly (e.g. via Bluetooth), and could be based on an application running on the tablet computer 200 listening for such a signal. A wireless communication link is then established for transmission of ultrasonic signal data between the tablet 200 and the docking station 201, which could operate in any of the ways described above in respect of the earlier embodiments.

If the tablet computer 200 is removed from the docking station 201, the presence sensor 210 may trigger the transmission of a further signal to the tablet computer 200 to disconnect the wireless connection.

By using the placement of the tablet computer 200 on or removal from the docking station to perform a "wake-up" or "go-to-sleep" function respectively, this embodiment can be used in situations where connecting/disconnecting the device or locating/removing the device onto/from a docking pin would be difficult or impractical. One such example is where the tablet computer is being used in a kitchen, when a user may have dough or grease on their fingers. Nonetheless the ledge portion 205 could be provided with a cut-out (not shown) to allow a charging cable to be inserted into the tablet computer if the user so requires.

In a possible variant of this embodiment (which may also be applicable in other embodiments) the back-rest portion 208 could comprise an capacitive or inductive charging area to allow wireless recharging of the tablet computer 200.

In further possible variants of any of the previously described embodiments, the docking station 101; 201 may be provided with its own signal generator. This means that instead of transmitting the ultrasonic wave-form between tablet and docking, a trigger signal is sent instead. This occupies much less wireless (e.g. Bluetooth) bandwidth than does transmitting the full signal. The wave-form could be wirelessly programmable.

Figure 4:
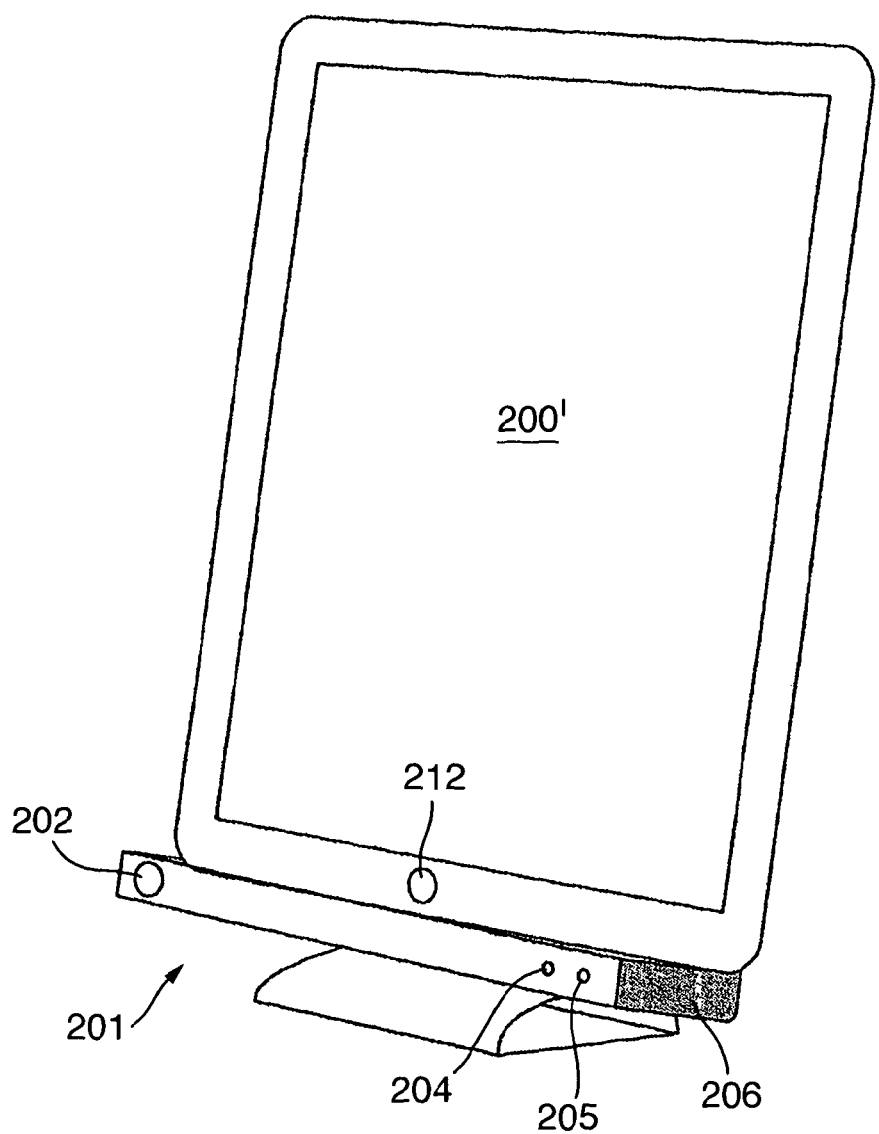
FIG. 4 is a schematic illustration of a further embodiment of the invention.

FIG. 4 shows an embodiment of the invention similar to that in FIG. 2. The only difference visible in the Figures is that the tablet computer 200' in this embodiment comprises its own ultrasonic transmitter 212. This could be a dedicated transmitter, or more conveniently a standard microphone which is also used for audible sound reproduction, since in general these can function quite adequately in the low-ultrasound spectrum.

Signals emitted by the tablet computer's transmitter 212 may be picked up by the receivers 204, 205 on the docking station 201. One possibility is that this may be used simply to detect the presence of the tablet computer 200' to "wake-up" the docking station 201, e.g. by signal strength or time-of-flight measurements, thereby removing the need for the presence detector 210 of FIG. 3. Another possibility is that the receivers 204, 205 could determine the exact position of the transmitter 212, and therefore of the tablet computer 200', relative to the docking station. This information could be used to give visual and/audible feedback—e.g. a warning message or indicator LED—as to whether the tablet computer 200' is in the 'right' position, which is useful when the docking station comprises a stand with no lateral location as is depicted. Alternatively the location information could be used to apply a correction offset to the signals received while operating in the touchless interaction mode, such that the system is tolerant to a degree of lateral misalignment. It could also be used to determine the orientation of the tablet computer 200'—i.e. whether it has been placed in portrait or landscape orientation. The signal from the tablet computer's transmitter 212 could be of very simple form or it could carry some data. One example of this would be an identification code which might enable the docking station 201 to identify what type of device has been placed on it (tablet computer, smart phone etc.) and adjust its touchless interaction zone accordingly.

Figure 5:
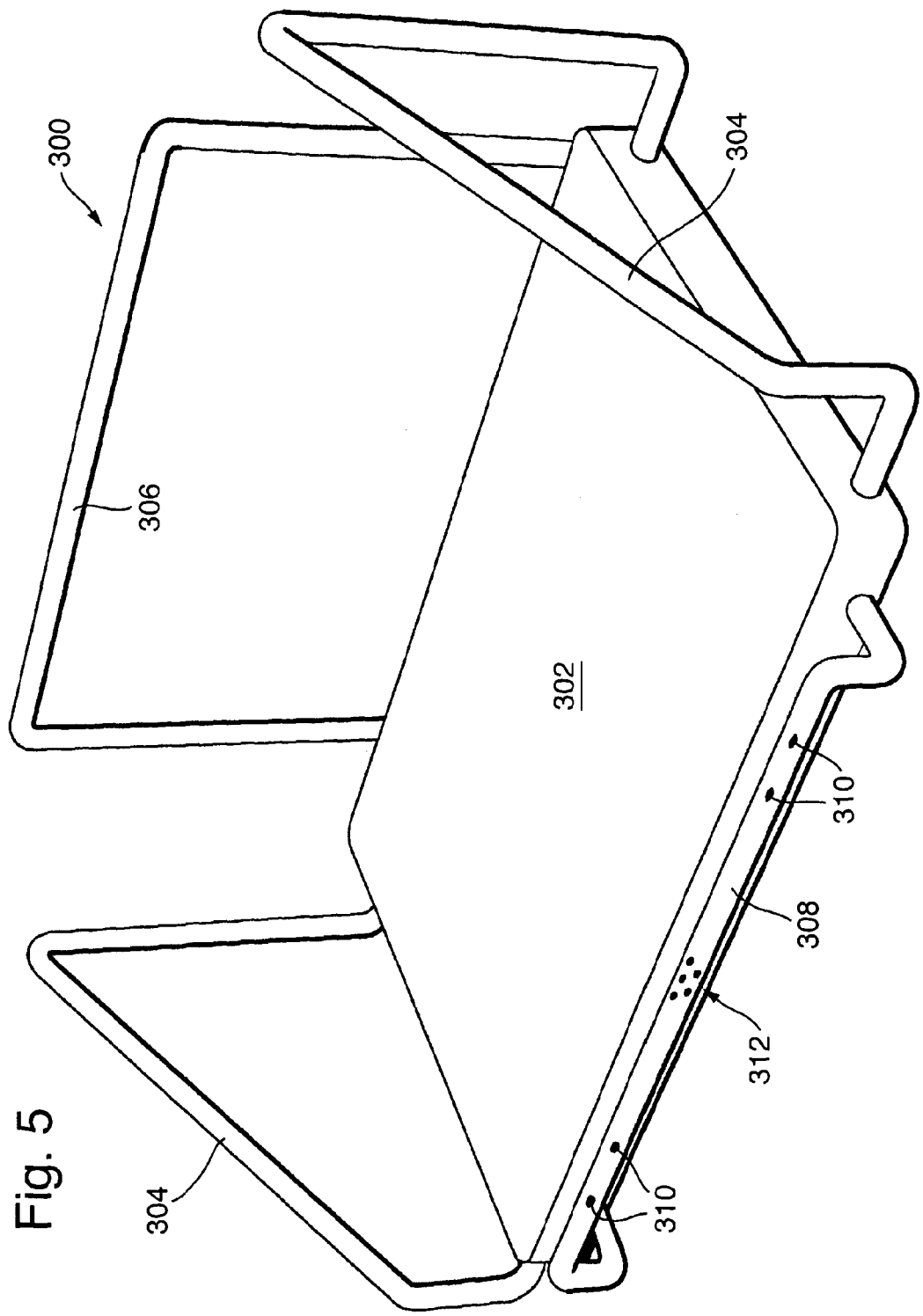
FIG. 5 is perspective view of a stand in accordance with another embodiment of the invention.

FIG. 5 shows a further embodiment of the invention. Here a stand 300 for a tablet computer is shown. It comprises a base unit 302 housing some circuitry, a pair of tubular side support member 304, a tubular back support member 306 and a tubular front support member 308. The support members 304, 206, 208 all comprise hollow tubes having a circular cross-section. Although not shown, the front support member 308 and one or both of the side support members 306 will typically have a docking connector for the tablet computer.

The front support also comprises a series of apertures: four single apertures 310 at either side and a central array of apertures 312. The purpose of these apertures is made clear in FIG. 6. FIG. 6 shows an exploded view of the front support member in which it is split longitudinally into two halves 308a, 308b, although of course it could be made as an integral tube and the components slid into place.

Inside the tube are two receiver boards 314, each mounting a pair of ultrasonic point receivers 316 which could for example be standard MEMS (micro-electromechanical systems) or PVDF transducers. The receivers 316 are aligned with the apertures 310 in the upper tube section 308a. In the centre of the tube is a cylindrical PVDF ultrasonic transmitter aligned with the central array of apertures 312.

In operation the embodiment shown in FIGS. 5 and 6 is able to add a touchless interaction mode to a tablet computer which is docked to it. The transmitters and receivers 318, 316 are used to generate and receive ultrasonic signals which are converted by a A-D converter and processed by a dedicated digital signal processor which are housed in the base unit 302. This provides input to the tablet computer via the docking connector (not shown) to control certain operations of the tablet according to the application. The docking connector can of course also supply power to the tablet to charge it.

Many other variants and alternatives to the embodiments described are possible within the scope of the invention. For example instead of the transducers in the docking station being located in a line along the lower ledge, some or all could be provided vertically (e.g. on a suitable extended back-rest) or in a two-dimensional array and/or more transducers may be added to increase the size or resolution of the touchless interaction zone.

In another possible variant, communication between the tablet computer and the dock station could be by means of audio systems, i.e. via the audio jacks in the tablet computer. These could be coupled to the docking station, providing an easier-to-fit connection. It also, by default, couples into the tablet computer's audio subsystem, obviating the need for the docking station to have its own dedicated ultrasonic subsystem. There could be modulators and demodulators in the docking station, shifting audible sound into the ultrasonic domain and vice versa.

In another possible variant a docking station having some or all of the features described above and suitable for use in a car could be provided. This could be used to receive a smartphone or GPS device to facilitate easy hands-free operation based on gestures to operate a navigation application, answer calls etc.

More generally the invention may also be implemented using touchless interaction modes based on technologies other than ultrasound—for example, infra-red, visible light (camera tracking) etc. It may be used with a wide variety of portable electronic devices, not just tablet computers.

The invention claimed is:

1. A portable electronic device comprising one or more ultrasonic transmitters and/or receivers, said portable electronic device being arranged such that it is operable in a standalone touchless interaction mode and an enhanced touchless interaction mode,
   wherein in the standalone touchless interaction mode, the portable electronic device is arranged to determine a user input using only said ultrasonic transmitters and/or receivers of the portable electronic device; and
   in the enhanced touchless interaction mode, the portable electronic device is arranged to cooperate with a peripheral device comprising one or more further transmitters in order to determine the user input using the ultrasonic transmitters and/or receivers of the portable electronic device and the one or more further transmitters of the peripheral device;
   wherein the portable electronic device is further arranged to determine when it has been placed in a predetermined position on, near or against the peripheral device and
   is configured such that, upon determining that it is in the predetermined position, the portable electronic device carries out data communication with the peripheral device such that they cooperate to enable the enhanced touchless interaction mode.

2. A device as claimed in claim 1 wherein said standalone and enhanced touchless interaction modes comprise the use of ultrasonic signals reflected from an input object to control a function of the portable electronic device.

3. A device as claimed in claim 1 configured to give an indication that the enhanced touchless interaction mode is active.

4. A system comprising a portable electronic device comprising one or more ultrasonic transmitters and/or receivers, said portable electronic device being arranged such that it is operable in a standalone touchless interaction mode and an enhanced touchless interaction mode,
   wherein in the standalone touchless interaction mode, the portable electronic device is arranged to determine a user input using only said ultrasonic transmitters and/or receivers of the portable electronic device; and
   in the enhanced touchless interaction mode, the portable electronic device is arranged to cooperate with a peripheral device comprising one or more further transmitters in order to determine the user input using the ultrasonic transmitters and/or receivers of the portable electronic device and the one or more further transmitters of the peripheral device;
   wherein the portable electronic device is further arranged to determine when it has been placed in a predetermined position on, near or against the peripheral device and
   is configured such that, upon determining that it is in the predetermined position, the portable electronic device carries out data communication with the peripheral device such that they cooperate to enable the supplemented touchless interaction mode.

5. A system as claimed in claim 4 wherein the peripheral device comprises one or more ultrasonic transmitters and/or receivers.

6. A system as claimed in claim 4 wherein the peripheral device comprises means for providing electrical power to the portable electronic device.

7. A system as claimed in claim 6 comprising a data connection between the portable electronic device and the peripheral device integrated with the means for providing electrical power to the portable electronic device.

8. A system as claimed in claim 4 wherein the portable electronic device and the peripheral device are configured to pass signals between them to enable the enhanced touchless interaction mode.

9. A system as claimed in claim 4 comprising a data communication arrangement between the portable electronic device and the peripheral device.

10. A system as claimed in claim 4 wherein the peripheral device is adapted to carry out at least some signal processing for implementing said enhanced touchless interaction mode.

11. A system as claimed in claim 10 wherein said processing comprises conversion to or from a digital signal.

12. A system as claimed in claim 4 wherein the peripheral device comprises a module arranged to characterize the movement of an input object and a module arranged to provide control signals to the portable electronic device based on said movement characterization.

13. A system as claimed in claim 4 wherein the peripheral device is adapted to share with the portable electronic device digital processing required to convert signals from transmitters provided on either or both devices into control signals to control the portable electronic device.

14. A system as claimed in claim 4 wherein said standalone and enhanced touchless interaction modes comprise the use of ultrasonic signals reflected from an input object to control a function of the portable electronic device.

15. A system as claimed in claim 4 wherein the peripheral device comprises a stand including one or more tubular support elements.

16. A system as claimed in claim 15 comprising at least one polyvinylidene flouride (PVDF) flexible ultrasonic transmitter housed in said tubular support element.

17. A system as claimed in claim 4 wherein the peripheral device comprises a signal generator configured to drive the one or more further transmitters of the peripheral device to transmit a signal to permit the enhanced touchless interaction mode.

18. A system as claimed in claim 4 wherein the peripheral device comprises a module arranged to detect the presence of the portable electronic device in order to wake up the peripheral device.

19. A system as claimed in claim 4 wherein the peripheral device and/or the portable electronic device is configured to give an indication that the standalone touchless interaction mode and/or the enhanced touchless interaction mode is active.

20. A system as claimed in claim 4 wherein the portable electronic device is provided with a module arranged to transmit a signal for receipt by the peripheral device for indicating the proximity and/or location of the portable electronic device with respect to the peripheral device.

21. A device as claimed in claim 1 adapted to receive a signal from the peripheral device permitting the enhanced touchless interaction mode.

22. A device as claimed in claim 1 adapted to be woken up by the peripheral device if the peripheral device detects the presence of the portable electronic device.

23. A device as claimed in claim 1 adapted to determine itself when it is in the predetermined position without receiving a signal indicative thereof from an external source.

24. A system as claimed in claim 4 wherein the portable electronic device is arranged to determine itself when it is in the predetermined position without receiving a signal indicative thereof from an external source.

25. A device as claimed in claim 1 adapted such that some signal processing required for the enhanced touchless interaction mode is carried out by the peripheral device and some signal processing required for the enhanced touchless interaction mode is carried out by the portable electronic device.

26. A system as claimed in claim 4 wherein some signal processing required for the enhanced touchless interaction mode is carried out by the peripheral device and some signal processing required for the enhanced touchless interaction mode is carried out by the portable electronic device.

27. A system as claimed in claim 4 wherein the one or more transmitters of the peripheral device are not sufficient on their own to implement a touchless interaction mode.

* * * * *